United States Patent
Miyake et al.

(10) Patent No.: US 10,617,952 B2
(45) Date of Patent: Apr. 14, 2020

(54) INFORMATION PROCESSING APPARATUS, INFORMATION PROCESSING METHOD, NON-TRANSITORY COMPUTER-READABLE STORAGE MEDIUM

(71) Applicant: SQUARE ENIX CO., LTD., Tokyo (JP)

(72) Inventors: Youichiro Miyake, Tokyo (JP); Takanori Yokoyama, Tokyo (JP); Kousuke Namiki, Tokyo (JP); Yoji Shirakami, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 15/556,872

(22) PCT Filed: Mar. 10, 2016

(86) PCT No.: PCT/JP2016/001325
§ 371 (c)(1),
(2) Date: Sep. 8, 2017

(87) PCT Pub. No.: WO2016/147620
PCT Pub. Date: Sep. 22, 2016

(65) Prior Publication Data
US 2018/0043258 A1    Feb. 15, 2018

Related U.S. Application Data

(60) Provisional application No. 62/132,651, filed on Mar. 13, 2015.

(51) Int. Cl.
*A63F 13/00* (2014.01)
*A63F 13/52* (2014.01)
(Continued)

(52) U.S. Cl.
CPC .............. *A63F 13/52* (2014.09); *A63F 13/00* (2013.01); *A63F 13/25* (2014.09); *A63F 13/55* (2014.09); *G06N 5/047* (2013.01); *G06F 3/0482* (2013.01)

(58) Field of Classification Search
CPC ................................ A63F 13/25; A63F 13/52
See application file for complete search history.

(56) References Cited

U.S. PATENT DOCUMENTS

2004/0075677 A1* 4/2004 Loyall ..................... G06F 3/011
715/706
2008/0120113 A1* 5/2008 Loyall ..................... G06F 3/011
704/270

(Continued)

FOREIGN PATENT DOCUMENTS

JP      2000-242499     9/2000
WO      2013/179468    12/2013

OTHER PUBLICATIONS

Japanese Office Action for Japanese Application No. 2017-542925 dated Aug. 6, 2018.

(Continued)

*Primary Examiner* — David L Lewis
*Assistant Examiner* — Eric M Thomas
(74) *Attorney, Agent, or Firm* — Greenblum & Bernstein, P.L.C.

(57) ABSTRACT

When one node, from nodes included in either a finite state machine including a node to which a state of a character is assigned or a behavior tree including a node to which action content of a character is assigned, is designated in accordance with a user operation, a screen, that is for querying a user as to which of a finite state machine and a behavior tree to assign to the one node, is caused to be displayed on a display screen. One from the finite state machine and the behavior tree that is selected in accordance with a user operation is assigned to the one node.

7 Claims, 10 Drawing Sheets

(51) Int. Cl.
  *A63F 13/25* (2014.01)
  *A63F 13/55* (2014.01)
  *G06N 5/04* (2006.01)
  G06F 3/0482 (2013.01)

(56) References Cited

U.S. PATENT DOCUMENTS

2010/0069035 A1* 3/2010 Johnson .................. H04W 4/02
                                                      455/404.1
2015/0082215 A1   3/2015 Sakai et al.

OTHER PUBLICATIONS

Damian Isla, "GDC 2005 Proceeding: Handling Complexity in the Halo 2 AI", Mar. 11, 2015.
"UI flow control on Unity" Behavior Tree, GREE Engineer's Blog, Jun. 20, 2014.
Youichiro Miyake "Current Status of Applying Inteligence for Digital Games" Journal of the Japanese Society for Artificial Intelligence, vol. 30 No. 1, Jan. 1, 2015, pp. 50 to 51.
The mechanism of the game AI introduced into "FFXV" revealed. The advanced AI system of a game engine, Luminous Studio, Sep. 2, 2015 [CEDEC 2015].
International Search Report in International Patent Application No. PCT/JP2016/001325, dated May 24, 2016.

* cited by examiner

INFORMATION PROCESSING APPARATUS, INFORMATION PROCESSING METHOD, NON-TRANSITORY COMPUTER-READABLE STORAGE MEDIUM

CLAIM FOR PRIORITY

This application is a U.S. National Stage of PCT/JP2016/001325 filed on Mar. 10, 2016, and claims the priority benefit of U.S. provisional application 62/132,651, filed Mar. 13, 2015, the contents of which is expressly incorporated by reference herein in their entireties.

TECHNICAL FIELD

The present invention relates to a technique concerning game character artificial intelligence.

BACKGROUND ART

In recent years, at conjunction with more abstract conception being required, flexible behavior is being treated as necessary in artificial intelligence employed in games. Conventionally, artificial intelligence in games has been developed with either a finite state machine (hereinafter FSM) or a behavior tree (hereinafter BT).

Figure 1:
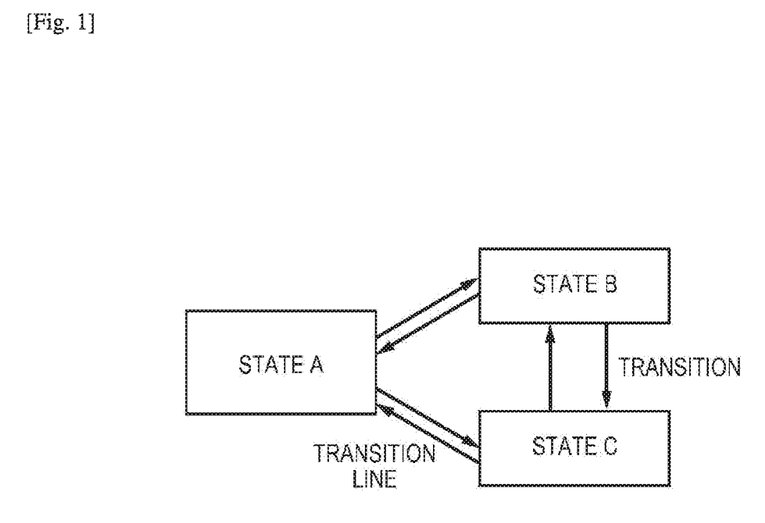
FIG. 1 is a view for illustrating an example configuration of an FSM.
Figure 2:
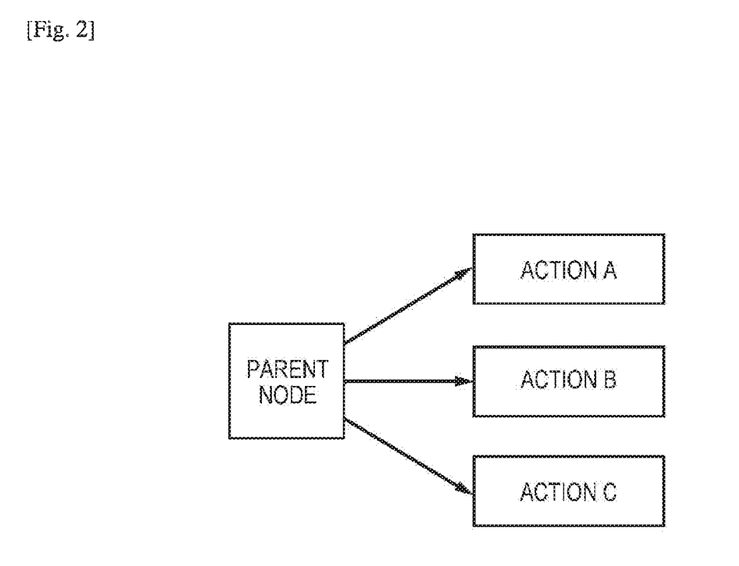
FIG. 2 is a view for illustrating an example configuration of a BT.

An FSM, as illustrated in FIG. 1, is configured such that states are made to be nodes, and these nodes are connected by transition lines; when an event occurs, a transition is made to the node that corresponds to that event, and the state corresponding to the node that is transitioned to is made to be the state of the character. Meanwhile, a BT is a tree representation of character action rules, and, as illustrated in FIG. 2, for example, defines which of child nodes (actions A-C) to execute and/or in what order to execute them depending on a parent node. In general, the FSM is superior for fixed control, and the BT is superior for on the fly control.

CITATION LIST

Non Patent Literature

NPL 1: Damian Isla, "GDC 2005 Proceeding: Handling Complexity in the Halo 2 AI", [online], Mar. 11, 2005, [Feb. 5, 2016 search], Internet <URL: http://www.gamasutra.com/view/feature/130663/gdc_2005_proceeding_handling_.php>

SUMMARY OF INVENTION

Technical Problem

However, because character artificial intelligence has been developed using only one of the FSM and BT conventionally, it has be impossible to take advantage of the advantages of both the FSM and BT. Accordingly, in the present invention, a technique for developing artificial intelligence that represents more flexible character action patterns taking advantage of advantages of both the FSM and BT is provided.

Solution to Problem

A feature of one embodiment of the invention is to comprise a display control unit configured to, when one node, from nodes included in either a finite state machine including a node to which a state of a character is assigned or a behavior tree including a node to which action content of a character is assigned, is designated in accordance with a user operation, cause a screen, that is for querying a user as to which of a finite state machine and a behavior tree to assign to the one node, to be displayed on a display screen; and an assignment unit configured to assign to the one node a selected one from the finite state machine and the behavior tree in accordance with the user operation.

Advantageous Effects of Invention

According to a configuration of the present invention, it is possible to develop artificial intelligence that represents more flexible character action patterns taking advantage of advantages of both the FSM and BT.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings.

First Embodiment

Explanation is given for an example of an information processing apparatus that, when one node, from nodes included in either a finite state machine including a node to which a state of a character is assigned or a behavior tree including a node to which action content of a character is assigned, is designated in accordance with a user operation, causes a screen, that is for querying a user as to which of a finite state machine and a behavior tree to assign to the one node, to be displayed on a display screen; and assigns to the one node a selected one from the finite state machine and the behavior tree in accordance with the user operation.

Here, a "character" is a virtual object that exists in a game world (a so-called virtual world), and is a virtual object whose next state is determined based on dynamic or static information (an event) in that virtual world. Accordingly, so long as such a definition can apply, not only an appearing object that appears in a game, such as a person, an animal, a plant, a vehicle, or a building, but also constituent elements of the virtual space, such as a light source in the virtual space, may correspond to a "character" hereinafter.

Figure 3:
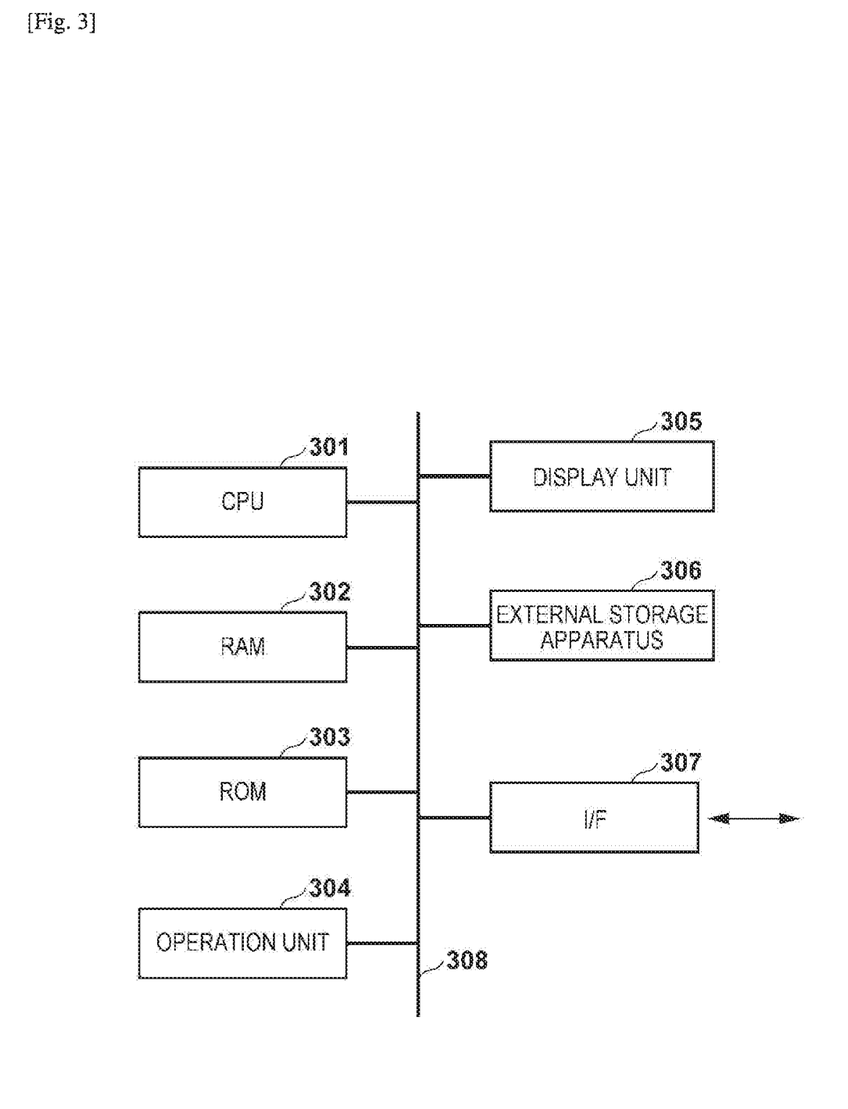
FIG. 3 is a block diagram for illustrating an example of a hardware configuration of a computer apparatus.

Firstly, using the block diagram of FIG. 3, explanation is given for an example of a hardware configuration of a computer apparatus such as a PC (personal computer) or the like which is applied to such an information processing apparatus. Additionally, the hardware configuration example illustrated in FIG. 3 is an example of a hardware configuration of a computer apparatus that can be applied to the foregoing information processing apparatus, and any configuration may be employed if it is a configuration by which it is possible to realize the processing explained below.

By executing processing using a computer program and/or data that is stored in a RAM 302 or a ROM 303, a CPU 301, in addition to performing operation control of the computer apparatus on the whole, executes or controls each process explained later as processes that the computer apparatus performs.

The RAM 302 comprises an area for storing computer programs and data loaded from the ROM 303 or an external storage apparatus 306, and data received from an external unit via an I/F (interface) 307. Furthermore, the RAM 302 comprises a work area that is used when the CPU 301 executes or controls various types of processing. In this way, the RAM 302 can provide various areas as appropriate.

In the ROM 303, apparatus settings data and computer programs (a boot program or the like) that need not be rewritten are stored.

An operation unit 304 is configured by a keyboard, a mouse or the like, and is a user interface by which a user of the apparatus can input various instructions to the CPU 301 by operations.

A display unit 305 is configured by a CRT, a liquid crystal screen, or the like, and can display a result of processing by the CPU 301 using images, text or the like.

The external storage apparatus 306 is a large capacity information storage device as typified by a hard disk drive device. An OS (operating system) and data and computer programs for causing the CPU 301 to execute or control the various processes explained later as processes that the computer apparatus performs are stored in the external storage apparatus 306. In computer programs stored in the external storage apparatus 306, a computer program corresponding to a later explained GUI (Graphical User Interface) is included. Also, in data saved on the external storage apparatus 306, data corresponding to the foregoing GUI, and data treated as known information in the explanation below is included. Computer programs and data saved in the external storage apparatus 306 are loaded into the RAM 302 as appropriate in accordance with control by the CPU 301, and become the target of processing by the CPU 301.

The I/F 307 is for performing a wired and/or wireless data communication with an external device, and, for example, configuration may be taken such that a computer program and data that is explained as something that is obtained from the external storage apparatus 306 in the following explanation is obtained via the I/F 307 from an external device.

All of the CPU 301, the RAM 302, the ROM 303, the operation unit 304, the display unit 305, the external storage apparatus 306 and the I/IF 307 described above are connected to a bus 308.

Next, explanation is given for a GUI for generating artificial intelligence data that defines action patterns of a character that appears in a game. Note that it is assumed that a plurality of pre-generated FSMs and BTs are saved as files in the external storage apparatus 306. When a user inputs an instruction to activate the GUI by operating the operation unit 304 (for example, when an icon for the GUI displayed on the display screen of the display unit 305 is double clicked with a left button of a mouse), the CPU 301 loads the GUI computer program and data from the external storage apparatus 306 into the RAM 302, and executes that computer program referencing the data as appropriate, and thereby causes a GUI initial screen to be displayed on the display screen of the display unit 305. It is necessary for the user to first, by operating the operation unit 304, instruct in this initial screen which of an FSM and a BT to set at the highest layer of the artificial intelligence data which has a hierarchical structure.

For example, the CPU 301 displays a list on a display screen of the display unit 305 of file names (corresponding icons as necessary) of FSMs saved in the external storage apparatus 306 when a user inputs an instruction for setting an FSM at the highest layer by operating the GUI using the operation unit 304. The user selects one from the FSMs displayed in the list by operating the operation unit 304. With this, the CPU 301 causes the display screen of the display unit 305 to display a node group defined by the selected FSM file.

Meanwhile, the CPU 301 displays a list, on a display screen of the display unit 305, of file names (corresponding icons as necessary) of BTs saved in the external storage apparatus 306 when a user inputs an instruction for setting a BT at the highest layer by operating the GUI using the operation unit 304. The user selects one from the BTs displayed in the list by operating the operation unit 304. With this, the CPU 301 causes the display screen of the display unit 305 to display a node group defined by the selected BT file.

Hereinafter, explanation is given with an example of a case in which the user operates the GUI using the operation unit 304 to input an instruction to set an FSM at the highest layer and thereafter a file of an "FSM having a node to which a character state A is assigned, a node to which a character state B is assigned, and a node to which a character state C is assigned, and in which the respective nodes are connected by transition lines" is selected from the FSM file group displayed in the list.

Figure 4:
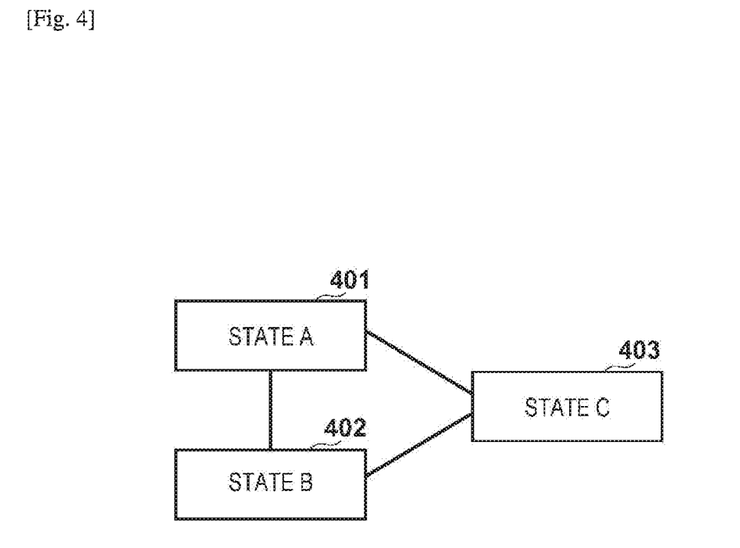
FIG. 4 is a view for illustrating an example configuration of a selected FSM.

Here, on the GUI, as illustrated in FIG. 4, the nodes 401-403 are displayed together with transition lines. A node 401 to which the character state A is assigned is displayed with a character string representing "state A" superimposed thereon; a node 402 to which the character state B is assigned is displayed with a character string representing "state B" superimposed thereon; a node 403 to which the character state C is assigned is displayed with a character string representing "state C" superimposed thereon; and furthermore, transition lines are displayed between the nodes.

Here, explanation is given for a method of operating to assign either of the FSM and the BT to the node 403. Hereinafter, explanation is given of an operation method using a mouse which is an example of the operation unit 304; however, any device may be used if the same object can be achieved.

Figure 5:
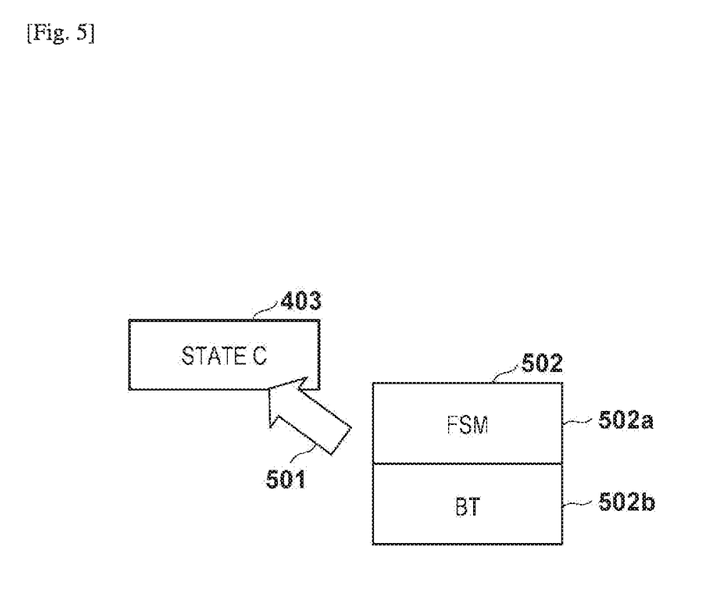
FIG. 5 is a view for explaining a method for assigning either of an FSM and a BT.

As illustrated in FIG. 5, when the user causes a mouse pointer 501 to move onto the node 403 by operating the mouse and then presses a right button of the mouse there, the CPU 301 causes a menu window 502, which is for querying the user (allowing to select) as to whether to assign an FSM or to assign a BT to the node 403, to be displayed on a display screen of the display unit 305.

Figure 6A:
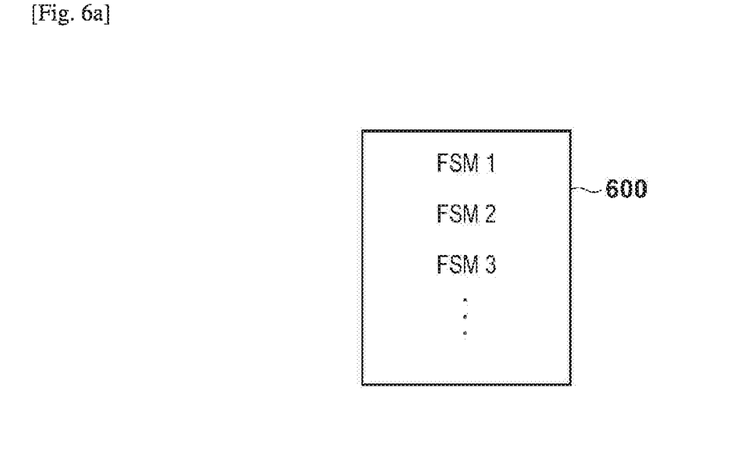
FIG. 6a is a view for explaining an assignment of an FSM.
Figure 6B:
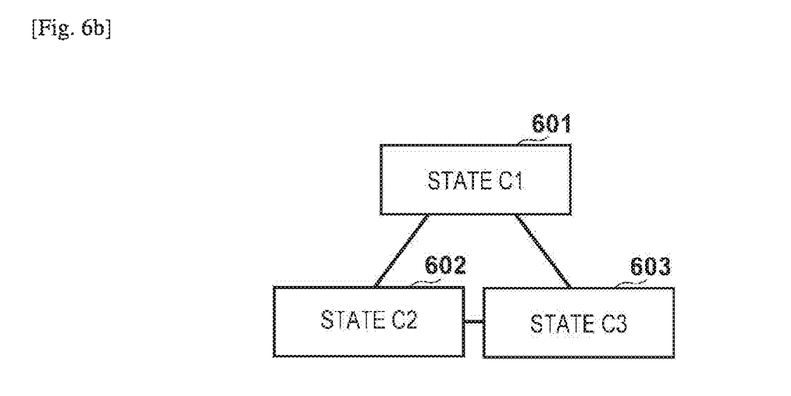
FIG. 6b is a view for explaining an assignment of an FSM.

Here, when the user causes the mouse pointer 501 to move within a region 502*a* in the menu window 502 (a region for selecting FSM) by operating the mouse, and then presses a left button of the mouse there, the CPU 301 causes a menu window 600 that displays in a list file names (corresponding icons as necessary) of the respective FSM files saved in the external storage apparatus 306 as illustrated in FIG. 6*a* to be displayed on the display screen of the display unit 305. When the user causes the mouse pointer 501 to move to "FSM 3" by operating the mouse and then presses a left button of the mouse there, the CPU 301 assigns the FSM that the file whose file name is "FSM 3" defines to the node 403. A configuration of the FSM that the file whose file name is "FSM 3" defines is illustrated in FIG. 6*b*. As illustrated in FIG. 6*b*, the FSM that the file whose file name is "FSM 3" defines is an "FSM having a node 601 to which a character state C1 is assigned, a node 602 to which a character state C2 is assigned, and a node 603 to which a character state C3 is assigned, and in which the respective nodes are connected by transition lines". The CPU 301 causes something in which the node 403 in the FSM of FIG. 4 is replaced by the FSM of FIG. 6*b* to be displayed on the display screen of the display unit 305 as illustrated in FIG. 6*c*.

Figure 6C:
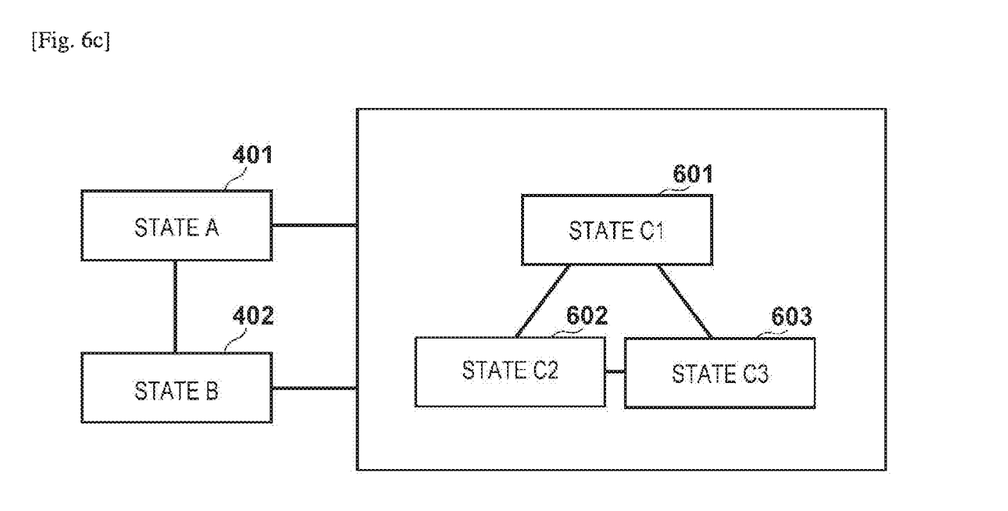
FIG. 6c is a view for explaining an assignment of an FSM.

Note that an operation rule of an artificial intelligence having a configuration as illustrated in FIG. 6*c* is as follows. Essentially, the operation of the FSM in which the state of the character transitions to a state corresponding to an event if that event occurs in the game is followed, but in a situation in which the current state of the character is the state A, the state of the character transitions to the state C1 which falls under the state C when a condition for transitioning from the state A to the state C is satisfied in the game (when a event for causing a transition from the state A to the state C occurs during the game). Also, in a situation in which the current state of the character is the state B, the state of the character transitions to the state C1 when a condition for transitioning from the state B to the state C is satisfied during the game (when an event for causing transition from the state B to the state C occurs during the game). This is because the initial state in the state C is set to C1, and if the initial state were set to C2, for example, transition would be from the state A (the state B) to the state C2. Also, if the current state of the character is the state C1, the state of the character transitions to the state C2 (C3) when a condition for transitioning from the state C1 to the state C2 (C3) is satisfied during the game. Also, if a corresponding condition is satisfied, it is possible to transition from the states C1, C2 and C3 to the state A, the state B or the like.

Figure 7A:
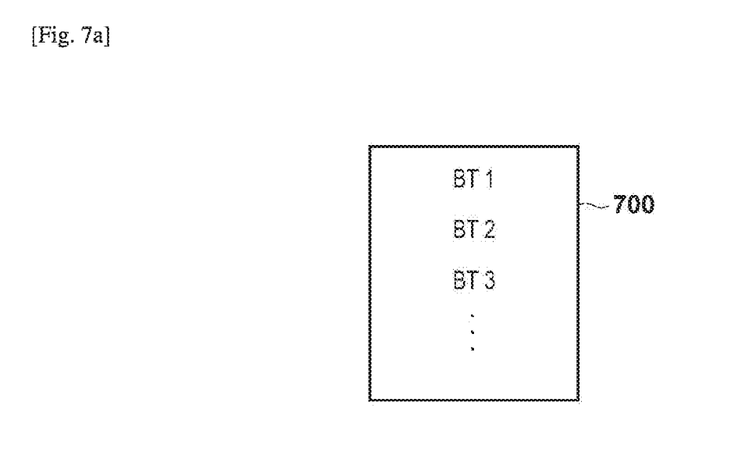
FIG. 7a is a view for explaining an assignment of a BT.
Figure 7B:
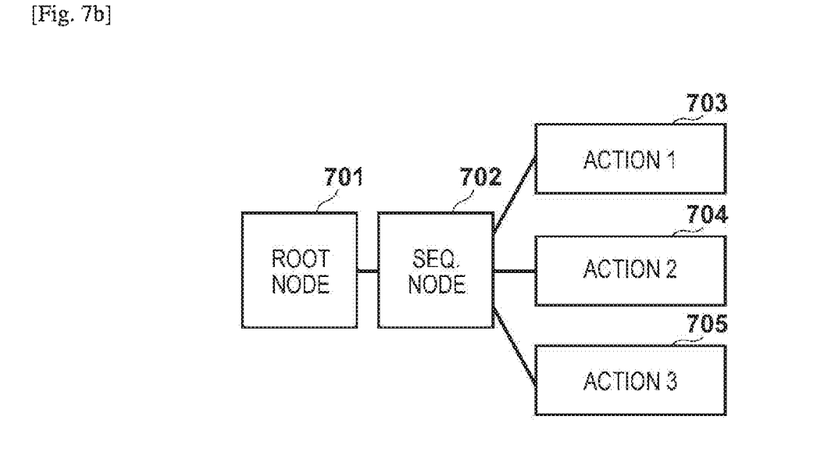
FIG. 7b is a view for explaining an assignment of a BT.

Meanwhile, when the user causes the mouse pointer 501 to move within a region 502*b* in the menu window 502 (a region for selecting BT) in FIG. 5 by operating the mouse, and then presses a left button of the mouse there, the CPU 301 causes a menu window 700 that displays in a list file names (corresponding icons as necessary) of the respective BT files saved in the external storage apparatus 306 as illustrated in FIG. 7*a* to be displayed on the GUI. Here, when the user causes the mouse pointer 501 to move to "BT 3" by operating the mouse and then presses a left button of the mouse there, the CPU 301 assigns the BT that the file whose file name is "BT 3" defines to the node 403. A configuration of the BT that the file whose file name is "BT 3" defines is illustrated in FIG. 7*b*. The BT that the file whose file name is "BT 3" defines is a "BT having a root node 701, a Sequence node 702, a node 703 to which a character action 1 is assigned, a node 704 to which a character action 2 is assigned, and a node 705 to which a character action 3 is assigned, and in which the respective nodes are connected by transition lines between the root node 701 and the Sequence node 702, and between the Sequence node 702 and the nodes 703-705", as is illustrated in FIG. 7*b*. The CPU 301 causes something in which the node 403 in the FSM of FIG. 4 is replaced by the BT of FIG. 7*b* to be displayed on the display screen of the display unit 305 as illustrated in FIG. 7*c*.

Figure 7C:
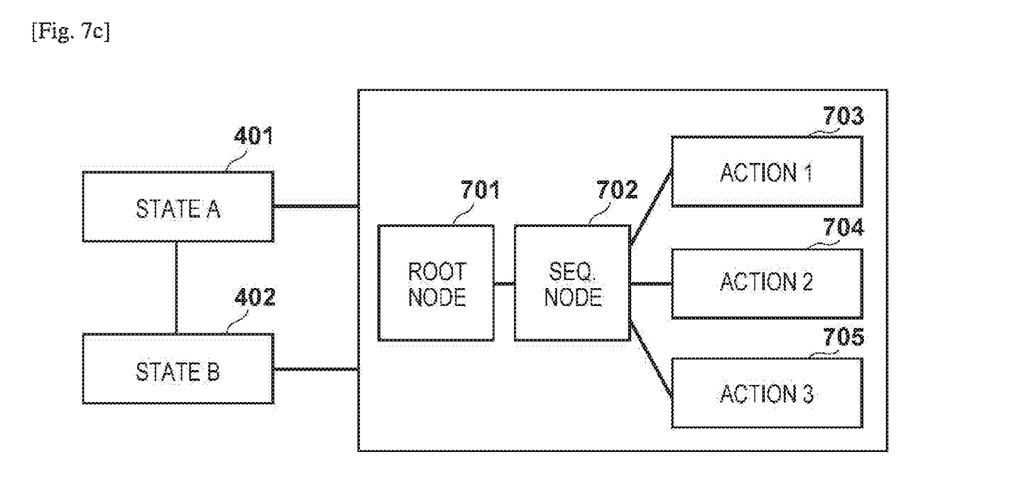
FIG. 7c is a view for explaining an assignment of a BT.

Note that an operation rule of an artificial intelligence having a configuration as illustrated in FIG. 7*c* is as follows. When a condition for transitioning from the state A to the state C is satisfied during the game (when an event for causing transition from the state A to the state C occurs during the game) in a situation in which the current state of the character is the state A, the state of the character transitions to the state C and the CPU 301 executes the Sequence node 702 via the root node 701. The Sequence node 702 is a node that sequentially executes its child nodes (the nodes 703-705 in FIG. 7*c*). Here, the CPU 301, by executing the Sequence node 702, sequentially executes the nodes 703-705, and thereby causes the character to act in accordance with the action 1, causes the character to act in accordance with the action 2, and causes the character to act in accordance with the action 3.

Figure 9:
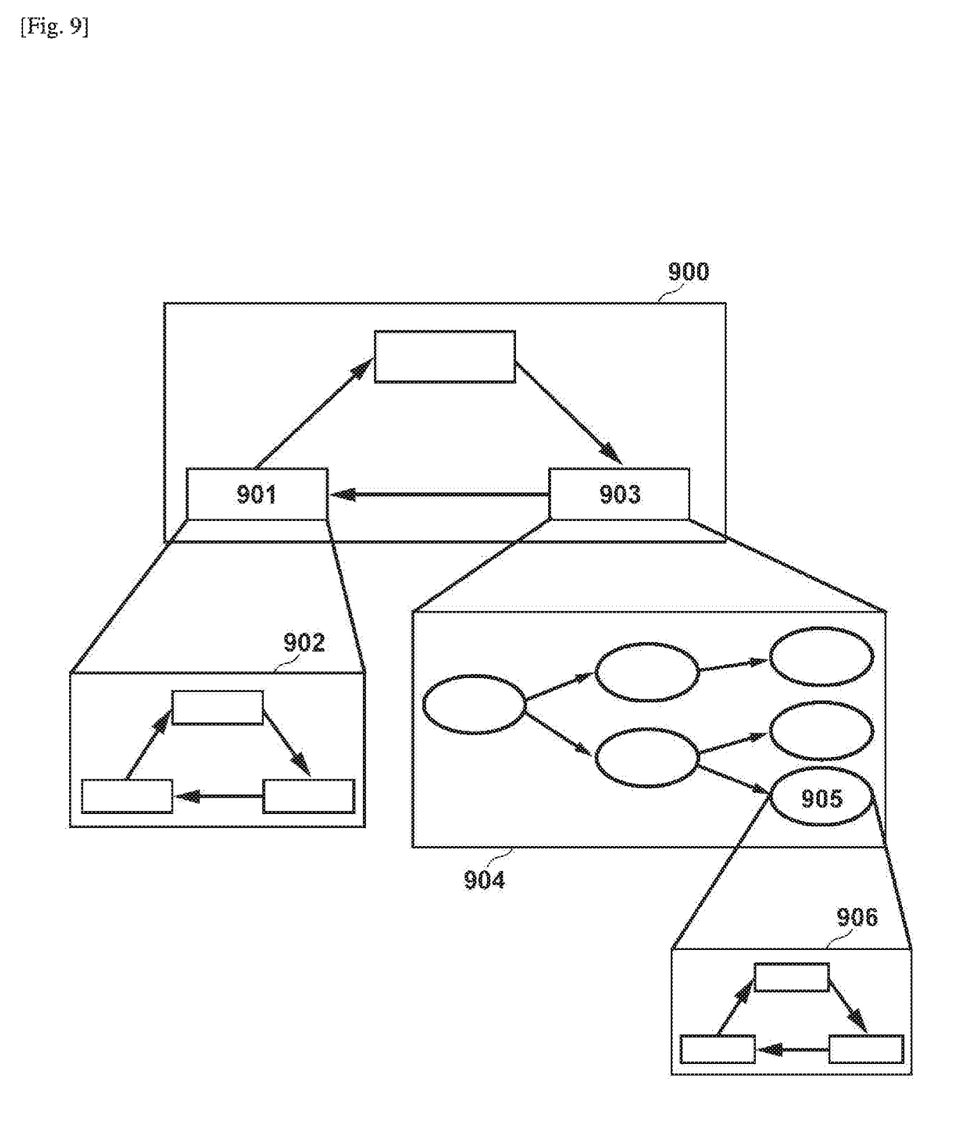
FIG. 9 is a view for illustrating an example of an FSM and BT nested hierarchical structure.

Thereafter, the user can designate one from a node group that is being displayed on the GUI, and assign a desired FSM or a desired BT to the designated node. An example of an FSM and BT nested hierarchical structure that is composed by this work is illustrated in FIG. 9. In FIG. 9, an FSM 902 (second layer) is assigned to a node 901 of an FSM 900 (the highest layer: first layer), and a BT 904 (second layer) is assigned to a node 903 of the FSM 900. Also, the FSM 906 (third layer) is assigned to a node 905 of the BT 904.

Then, when the user inputs a save instruction by operating the operation unit 304, the CPU 301 saves in the external storage apparatus 306 node groups and data indicating a transition relationship between nodes that are displayed on the GUI as artificial intelligence data. In the case of FIG. 9, the data of the FSM 900 is saved in the external storage apparatus 306 as the artificial intelligence data. In the data of the FSM 900, the FSM 902 is embedded in the node 901, the BT 904 is embedded in the node 903, and the FSM 906 is embedded in the node 905. Of course the configuration of the artificial intelligence data is not limited to this configuration, and any configuration may be employed if it is a configuration by which the relationships between the nodes can be understood. Configuration may also be taken such that the artificial intelligence data is saved after having been appropriately compressed.

Figure 10:
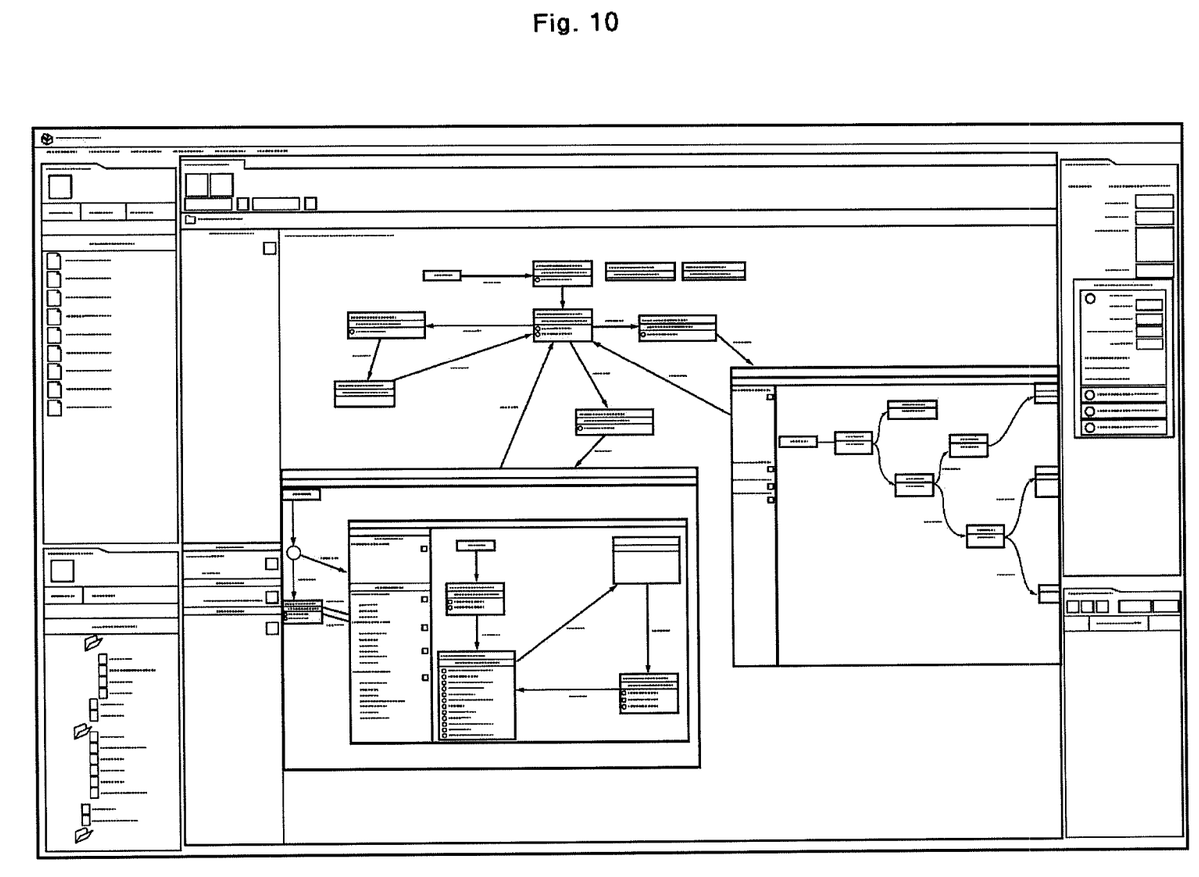
FIG. 10 is a view for illustrating an example of displaying a GUI while generating the nested hierarchical structure of the FSM and the BT.
Figure 11:
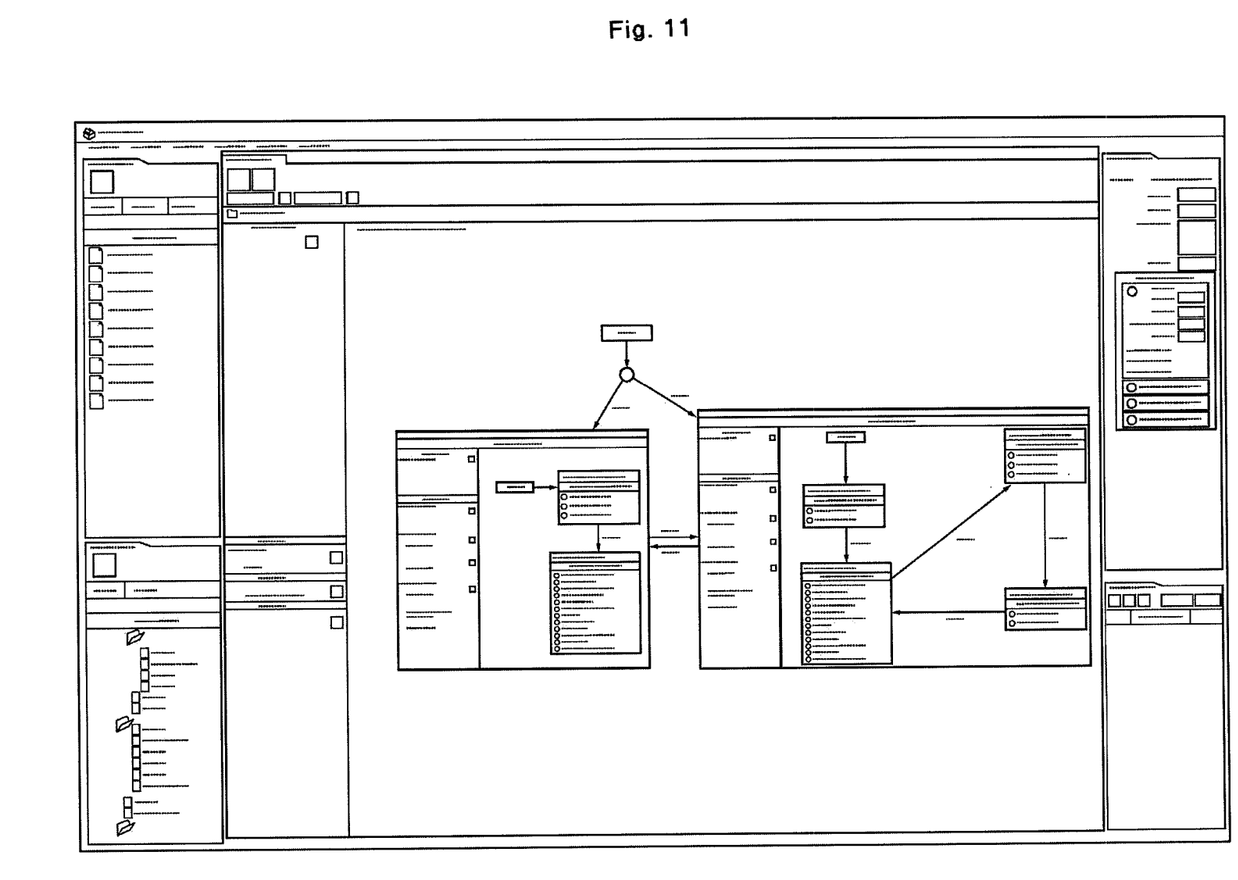
FIG. 11 is a view for illustrating an example of displaying a GUI while generating the nested hierarchical structure of a FSM.
Figure 12:
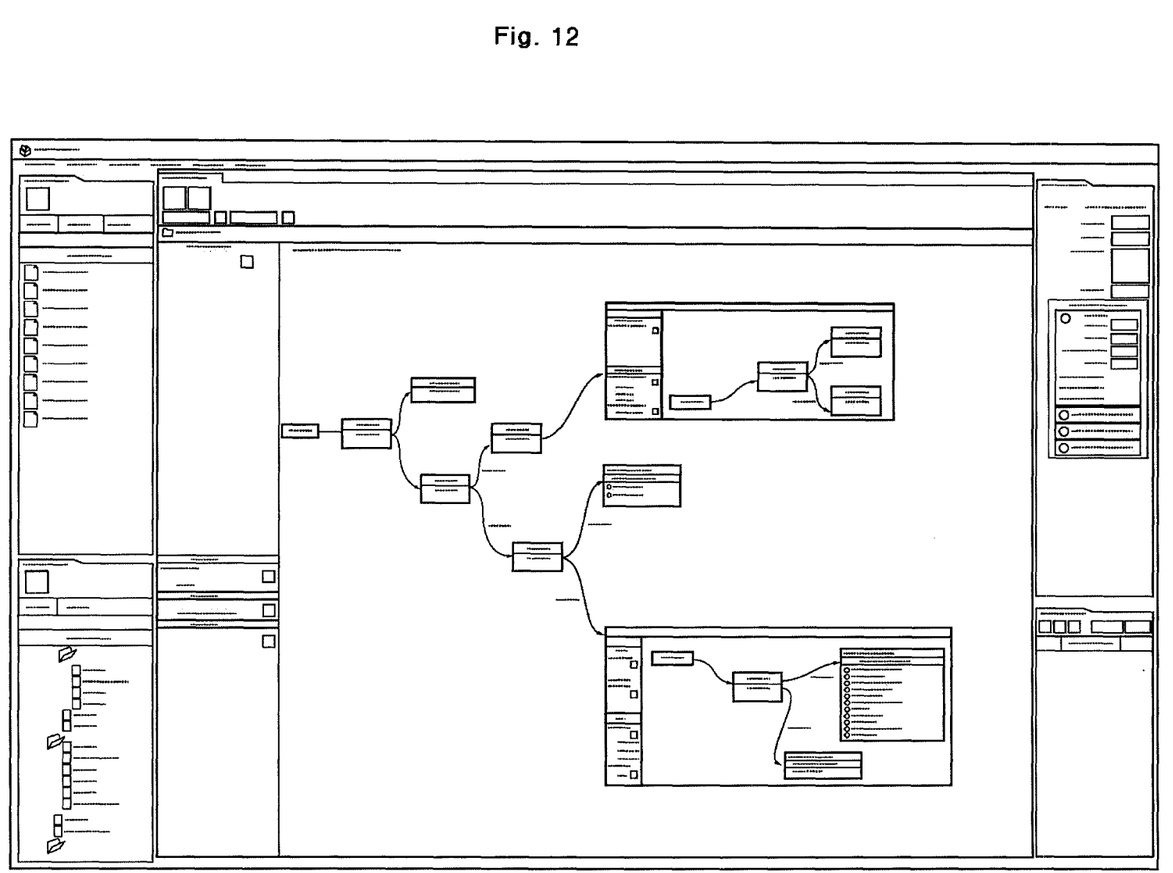
FIG. 12 is a view for illustrating an example of displaying a GUI while generating the nested hierarchical structure of a BT.

An example of displaying of a GUI during generation of an FSM and BT nested hierarchical structure, an example of displaying a GUI during generation of an FSM nested hierarchical structure, and an example of displaying of a GUI during generation of a BT nested hierarchical structure are respectively illustrated in FIGS. 10-12.

Explanation is given for processing for generating artificial intelligence data using a GUI explained above using FIG. 8 which illustrates a flowchart of that processing.

Figure 8:
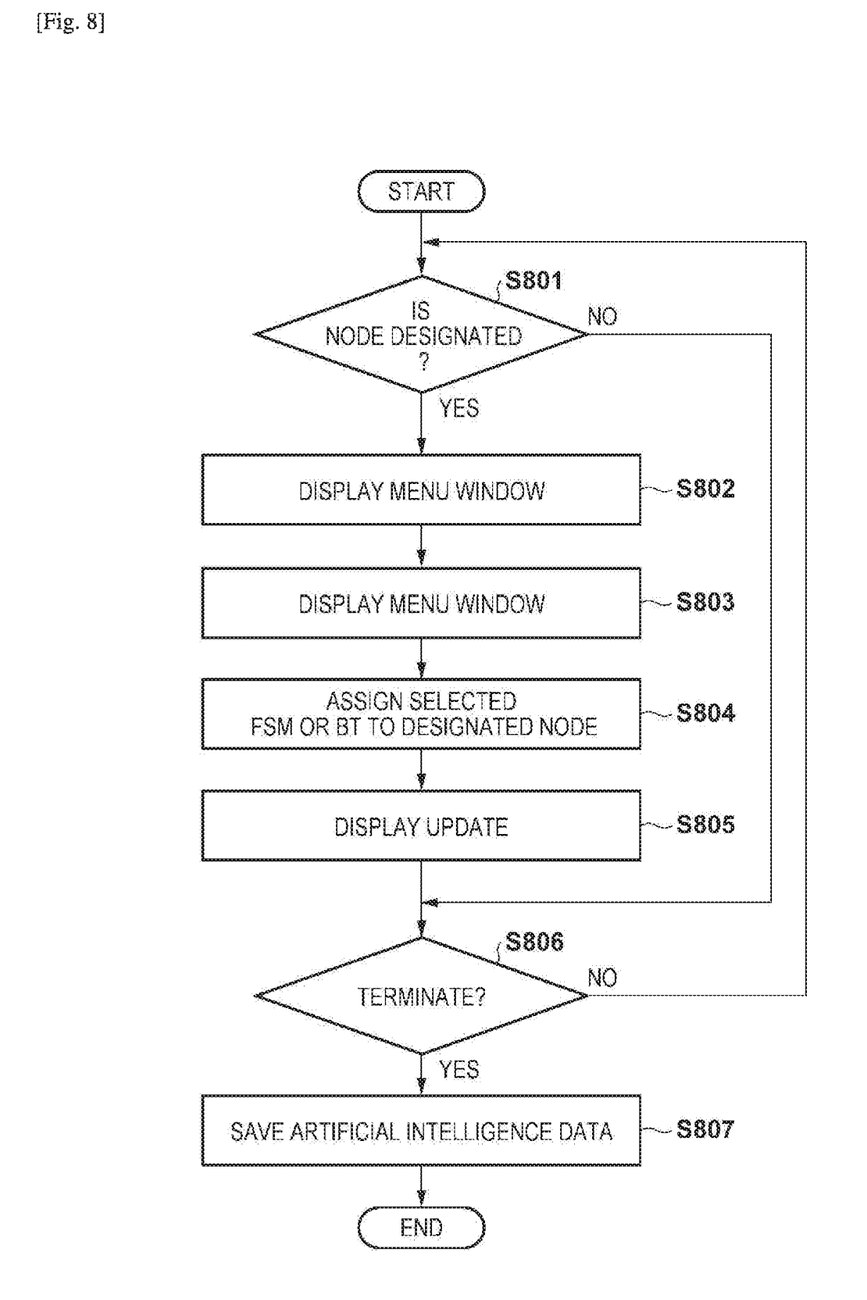
FIG. 8 is a flowchart for processing for generating artificial intelligence data that uses a GUI.

<Step S801>

The CPU 301 determines whether or not one node from a node group that is displayed on the GUI has been designated by the user (whether the mouse pointer is caused to move onto a node, and the right button is pressed there in the foregoing example). If the result of this determination is that one node from a node group being displayed on the GUI is designated by the user, the processing proceeds to step S802; if not designated, the processing proceeds to step S806.

<Step S802>

The CPU 301 causes a menu window to allow the user to select whether to assign an FSM or to assign a BT to the node designated by the user (designation node) to be displayed on the display screen of the display unit 305.

<Step S803>

The CPU 301 causes a menu window that displays in a list file names of files of FSMs saved in the external storage apparatus 306 to be displayed on the GUI if an instruction to assign an FSM is input by the user (if the mouse pointer 501 is caused to move within the region 502*a*, and the left button of the mouse is pressed there, in the foregoing example). Meanwhile, the CPU 301 causes a menu window that displays in a list file names of files of BTs saved in the external storage apparatus 306 to be displayed on the GUI if an instruction to assign a BT is input by the user (if the mouse pointer 501 is caused to move within the region 502*b*, and the left button of the mouse is pressed there, in the foregoing example).

<Step S804>

The CPU 301 assigns a file that the user selected from the file group displayed in the list (an FSM file group or a BT file group) to the designation node.

<Step S805>

The CPU 301 updates the display of the GUI. In the foregoing example, a configuration illustrated in FIG. 6*c* (in the case where an instruction to assign the FSM of FIG. 6*b* is input by the user) or a configuration illustrated in FIG. 7*c* (in the case where an instruction to assign the BT of FIG. 7*b* is input by the user) is displayed in place of the display of the FSM of FIG. 4.

<Step S806>

If the CPU 301 detects that the user inputs a termination instruction by operating the operation unit 304 (an instruction to save the artificial intelligence data being generated, and terminate), the processing proceeds to step S807. Meanwhile, if the CPU 301 does not detect that the user inputs the termination instruction by operating the operation unit 304, the processing returns to step S801.

<Step S807>

The CPU 301 saves artificial intelligence data having a configuration displayed on the GUI at the current stage to the external storage apparatus 306, and causes the GUI to terminate.

Second Embodiment

Explanation was given for a technique of generating artificial intelligence data in the first embodiment. In the present embodiment, explanation is given for a technique for performing character operation control using such artificial intelligence data. The artificial intelligence data explained in the first embodiment is for performing operation control of a character that appears in a game, and therefore is embedded in the data of that game. The data of the game is read into a game device, and the processor of that game device executes the game using this data. Note that a computer program and not just data is included in the artificial intelligence data and the game data.

Various configurations can be considered for the configuration of the game device, but below it is explained on the assumption that the game device has the configuration illustrated in FIG. 3 as an example. In such a case, game data including the foregoing artificial intelligence data is installed in the external storage apparatus 306, and the CPU 301 executes the game using this game data. Note that configuration may also be taken such that the game data is stored in a computer-readable storage medium such as a CD-ROM, a DVD-ROM, or the like instead of installing the game data in the external storage apparatus 306, the game data is read by a storage medium drive apparatus, and the CPU 301 executes the game using the read game data.

In the first embodiment, explanation was given for character operation control in accordance with the artificial intelligence data having the configuration illustrated in FIG. 6*c*, and character operation control in accordance with artificial intelligence data having the configuration illustrated in FIG. 7*c*, but the following operation control is performed if a condition for causing transition to the state B is satisfied during execution of the node 704, for example, in the character operation control in accordance with the artificial intelligence data having configuration illustrated in FIG. 7*c*, for example. That is, the CPU 301 performs control to cause the execution of the node 704 to be interrupted, and to cause the state of the character to transition to the state B. In this way, if the state transition condition is satisfied in an FSM at an n-th layer, a state transition is performed after having caused an operation of a BT of a lower layer (the meth (>n) layer) whose parent is that FSM to stop. Stopping the operation of BTs is performed in order from the lowest level BT.

Also, there are "random", "priority" and "parallel" nodes for BT nodes. For a "random" node, one of the child nodes at one layer lower than the "random" node is determined randomly, and the determined child node as well as child nodes whose parent is that determined child node are executed. For a "priority" node, a child node that is arranged at a higher position on the GUI among the child nodes at one layer lower than the "priority" node (the arrangement position of the child node can be changed as appropriate in accordance with an operation of the operation unit 304), and the child nodes whose parent is the child node that is arranged at the higher position are executed preferentially, and if that execution fails, a child node at one lower than the child node for which the execution failed among the child nodes at one layer below the "priority" node, and the child nodes whose parent is that child node are executed. For a "parallel" node, the child nodes at one layer lower than the "parallel" node, and child nodes whose parent are those child nodes are executed in parallel. Here, a BT may be configured using these kinds of nodes. Note that configuration may be taken so as to execute each process in the parallel processing by assigning processors individually.

Note that in the first and second embodiments, while an FSM of a configuration illustrated in FIG. 6*b* is used as the FSM, and a BT of a configuration illustrated in FIG. 7*b* is used as the BT, the configuration of the FSM is not limited to the configuration of FIG. 6b, and the configuration of the BT is not limited to the configuration of FIG. 7b.

Also, after the FSM or the BT is assigned to the node that the user designated as in FIG. 6c and FIG. 7c, the user may edit the assigned FSM or BT by operating the operation unit 304. For example, nodes may be newly added, existing nodes may be deleted, existing nodes may be replaced with other nodes, and the transition destination of nodes may be changed. If the edited FSM or BT is saved separately, the separately saved FSM or BT can be used as a candidate to be set at the highest layer when generating new artificial intelligence data, and can also be used as a candidate for assignment to a target node in artificial intelligence data that is currently being generated or that is generated the next time or thereafter.

Also, in the first and second embodiments, the FSM or BT assigned to a node is one that is selected by a user from FSMs and BTs which are generated in advance and saved in the external storage apparatus 306. However, an FSM or BT that is assigned to a node may be generated on a GUI. For example, the CPU 301 causes the menu window 502 of FIG. 5 to be displayed on the display screen of the display unit 305 when the user causes a mouse pointer to move onto the target node by operating the mouse and then presses a right button of the mouse there. Here, when the user causes a mouse pointer to move into the region 502a in the menu window 502 by operating the mouse and then presses a left button of the mouse there, the CPU 301 causes a GUI to generate an FSM (a GUI for generating an FSM) to be newly displayed on the display screen of the display unit 305. With this, the user can generate an FSM on the GUI for generating an FSM using the mouse, the keyboard, or the like. Also, when the user inputs a generation completion instruction by operating the keyboard or the mouse, the CPU 301 assigns the FSM generated on the GUI for generating an FSM to the target node. Meanwhile, when the user causes a mouse pointer to move into the region 502b in the menu window 502 by operating the mouse and then presses a left button of the mouse there, the CPU 301 causes a GUI for generating a BT (a GUI for generating an BT) to be newly displayed on the display screen of the display unit 305. With this, the user can generate a BT on the GUI for generating a BT using the mouse, the keyboard, or the like. Also, when the user inputs a generation completion instruction by operating the keyboard or the mouse, the CPU 301 assigns the BT generated on the GUI for generating a BT to the target node.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of U.S. Patent Provisional Application 62/132,651, filed Mar. 13, 2015 which is hereby incorporated by reference herein in its entirety.

The invention claimed is:

1. An information processing apparatus, comprising:
a display configured to, when a target node is designated from a plurality of nodes in accordance with a user operation, cause a screen for querying a user as to which of a finite state machine and a behavior tree that are available for selection to assign to the target node to be displayed, wherein the plurality of nodes includes a finite state machine node to which the finite state machine is assigned and a behavior tree node to which the behavior tree is assigned available for selection, and wherein the finite state machine includes a node to which a state of a character is assigned and the behavior tree includes a node to which action content of a character is assigned; and
a processor configured to assign, to the target node, one of the finite state machine and the behavior tree that are available for selection in accordance with the user operation via the screen.

2. The information processing apparatus according to claim 1, wherein the display, if the finite state machine is selected in accordance with the user operation via the screen, displays in a list one or more finite state machines that become candidates for assignment to the target node, and
the processor assigns the finite state machine selected in accordance with the user operation from the one or more finite state machines displayed in the list to the target node.

3. The information processing apparatus according to claim 1, wherein the display, if the behavior tree is selected in accordance with the user operation via the screen, displays in a list one or more behavior trees that become candidates for assignment to the target node, and
the processor assigns the behavior tree selected in accordance with the user operation from one or more behavior trees displayed in the list to the target node.

4. The information processing apparatus according to claim 1, wherein the processor is further configured to edit, in accordance with a user operation, the one of the finite state machine and the behavior tree selected in accordance with the user operation via the screen.

5. The information processing apparatus according to claim 1, further comprising a memory configured to save, as artificial intelligence data of the character, data of the plurality of nodes which is generated by assignment by the processor.

6. An information processing method comprising:
when a target node is designated from a plurality of nodes in accordance with a user operation, causing a screen for querying a user as to which of a finite state machine and a behavior tree that are available for selection to assign to the target node to be displayed on a display, wherein the plurality of nodes includes a finite state machine node to which the finite state machine is assigned and a behavior tree node to which the behavior tree is assigned available for selection, and wherein the finite state machine includes a node to which a state of a character is assigned and the behavior tree includes a node to which action content of a character is assigned; and
assigning, to the target node by a processor, one of the finite state machine and the behavior tree that are available for selection in accordance with the user operation via the screen.

7. A non-transitory computer-readable storage medium storing a computer program for causing a computer to function as:
a display configured to, when a target node is designated from a plurality of nodes in accordance with a user operation, cause a screen for querying a user as to which of a finite state machine and a behavior tree that are available for selection to assign to the target node to be displayed, wherein the plurality of nodes includes a finite state machine node to which the finite state machine is assigned and a behavior tree node to which the behavior tree is assigned available for selection, and wherein the finite state machine includes a node to which a state of a character is assigned and the behavior tree includes a node to which action content of a character is assigned; and a processor configured to assign, to the target node, one of the finite state machine and the behavior tree that are available for selection in accordance with the user operation via the screen.

\* \* \* \* \*